United States Patent Office 3,558,608
Patented Jan. 26, 1971

3,558,608
20-[N-(N',N' - DISUBSTITUTED AMINOALKYL) FORMAMIDO]-5α-PREGNAN-3β-OLS AND Δ⁵ DERIVATIVES THEREOF
Paul D. Klimstra, Northbrook, Ill., assignor to G. D. Searle & Co., Chicago, Ill., a corporation of Delaware
No Drawing. Filed Dec. 30, 1968, Ser. No. 794,468
Int. Cl. C07c 173/10
U.S. Cl. 260—239.5         6 Claims

ABSTRACT OF THE DISCLOSURE

20 - [N - (N', N' - disubstituted aminoalkyl)formamido] - 5α - pregnan - 3β - ols and Δ⁵ derivatives thereof are prepared by reaction of the corresponding 20-[N-(N',N'-disubstituted aminoalkyl)amino] compounds with a formylating reagent. These formamido compounds display useful pharmacological properties, e.g., anti-inflammatory, anti-bacterial, anti-protozoal and anti-algal.

---

The present invention is concerned with novel steroidal formamides and, more particularly, with 20-[N-(N',N'-disubstituted aminoalkyl)formamido] - 5α - pregnan 3β-ols and Δ⁵ derivatives thereof represented by the following structural formula

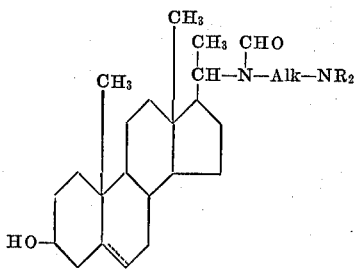

wherein Alk is a lower alkylene radical, $NR_2$ is a disubstituted amino radical selected from the group consisting of di-(lower alkyl)amino and heterocycloaliphatic amino radicals and the dotted line signifies an optional 5,6 double bond.

The lower alkyl radicals represented in the foregoing structural formula are typified by methyl, ethyl, propyl, butyl, pentyl, hexyl, heptyl and the branched-chain isomers thereof.

Examples of the heterocycloaliphatic amino radicals denoted in that formula are pyrrolidino, piperidino, morpholino and 4-methylpiperazino.

The novel compounds of this invention are conveniently manufactured by the reaction of starting materials represented by the formula

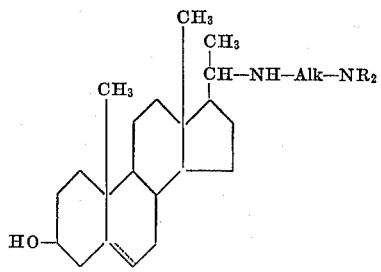

wherein Alk, $NR_2$ and the dotted line have the same meanings as recited hereinbefore, with a formylating reagent. A preferred formylating reagent is formic anhydride, which is conveniently produced in situ by reaction of formic acid with a suitable dehydrating agent such as acetic anhydride. A specific example is the reaction of 20-(2-piperidinoethyl)amino-5α-pregnan-3β-ol dihydrochloride with a mixture of formic acid and acetic anhydride to afford 20-[N-(2-piperidinoethyl)formamido]-5α-pregnan-3β-ol.

Equivalent to the organic bases of this invention are the corresponding pharmaceutically acceptable non-toxic acid addition and quarternary salts as exemplified by the citrate, oxalate, tartrate, maleate, ascorbate, gluconate, lactate, succinate, phosphate, sulfate, hydrobromide, hydrochloride, methiodide, ethiodide, methochloride, methobromide, methosulfate and ethosulfate.

The instant compounds are useful in view of their valuable pharmacological properties. They are, for example, anti-inflammatory agents as demonstrated by their ability to inhibit the edematous swelling associated with inflammatory states. In addition, they possess antimicrobial activity as evidenced by their ability to inhibit the growth of baceteria such as *Diplococcus pneumoniae*, protozoa such as *Tetrahymena gelleii* and algae such as *Chlorella vulgaris*.

The anti-inflammatody property of the compounds of this invention is exemplified by the activity of 20-[N-(2-dimethylaminoethyl)formamido]pregnan-5-en-3β-ol and 20 - [N-(2-piperidinoethyl)formamido]-5α-pregnan-3β-ol when tested in modification of the procedure disclosed by Winter et al., Proc. Soc. Exper. Biol. Med., 111, 544 (1962). The assay is described as follows:

Each of a group of 10 intact male rats weighing 100–130 g. is injected under the plantar surface of each hind foot with 0.1 ml. of a 1% solution of carrageenin (Type 402, Marine Colloids, Inc.). The test compound, dissolved or suspended in saline, corn oil or propylene glycol, is administered subcutaneously or intragastrically 1 hour prior to the carrageenin injection. The doses normally used are 25 mg. per rat subcutaneously and 5 mg. per rat intragastrically. Another such group serving as controls is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P<0.05$) in the swelling observed in control animals.

Representative of the anti-bacterial property of the instant compounds is the activity of 20-[N-(2-dimethylaminoethyl)formamido]pregn-5-en-3β-ol and 20 - [N-(2-dimethylaminoethyl)formamido] - 5α - pregnan - 3β - ol when tested in the following assay:

Sterile blood agar is inoculated with a 24 hour broth culture of the bacterium, *Diplococcus pneumoniae*, whereupon approximately 5 mg. of the test compound is placed on the inoculated agar surface. The agar is then incubated at 37° C. for 24 hours, at the end of which time it is observed for a zone of inhibition in the area immediately surrounding the test compound. Compounds which are effective in causing a zone of inhibition are designated active.

Illustrative of the anti-protozoal property of the compounds of the present invention is the activity of 20-[N-(2 - dimethylaminoethyl)formamido]-5α-pregnan-3β-ol, 20-[N-(2-dimethylaminoethyl)formamido]pregnan - 5 - en-3β-ol and 20-[N-(2-piperidinoethyl)formamido]-5α-pregnan-3β-ol when assayed by the following procedure:

A sterile nutrient medium of the following composition:

Proteose peptone—12 g.
Sucrose—8 g.
Distilled water—1000 ml.

is inoculated with a viable axenic culture of *Tetrahymena gelleii*, then is incubated at about 25° C. for 24 hours. At the end of that time, 0.5 ml. quantities are trasferred aseptically to test tubes containing approximately 5 mg. of the test compound. The test tubes containing the culture alone serve as controls. At the end of a second 24 hour incubation period, the tubes are examined microscopically in order to determine the degree of growth of the test organism. A compound causing a definite inhibition of growth of the organism as compared to the controls is considered active.

The anti-algal property of the instant compounds is exemplified by the activity of 20-[N-(2-dimethylaminoethyl)formamido] - 5α - pregnan - 3β - ol, 20-[N-(2-dimethylaminoethyl)formamido]pregn - 5 - en - 3β - ol and 20 - [N - (2 - piperidinoethyl)formamido]-5α-pregnan-3β-ol in the following assay:

Sterile Bristol agar is inoculated with an aqueous suspension of the alga, *Chlorella vulgaris*, whereupon 5 mg. of the test compound is placed on the inoculated agar surface. The inoculated agar is incubated at room temperature under artificial light for 7 days, at the end of which time it is examined for microbial growth. Activity is indicated by a clear zone of inhibition of growth surrounding the test compound.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials are expressed in parts by weight unless otherwise noted.

EXAMPLE 1

A mixture of 25 parts of acetic anhydride and 30.5 parts of formic acid is prepared and cooled, then is added to 3 parts of 20-(2-dimethylaminoethyl)amino-5α-pregnan-3β-ol. The resulting reaction mixture is heated on a steam bath for about 16 hours, then is diluted with water and made alkaline by the addition of aqueous sodium hydroxide. Methanol is added also during that time in order to maintain solution. The alkaline mixture is heated for several minutes, then is allowed to cool for about 30 minutes, at the end of which time the mixture is partitioned between water and ether. The ether solution is washed with water, then dried over anhydrous sodium sulfate and stripped of solvent by distillation under reduced pressure. The semi-solid residue is triturated with hexane to afford the crude product, which is recrystallized from ethyl acetate-hexane, thus affording 20-[N - (2 - dimethylaminoethyl)formamido]-5α-pregnan-3β-ol, melting at about 147–149°. This compound exhibits an optical rotation of —10.5° and is represented by the following structural formula

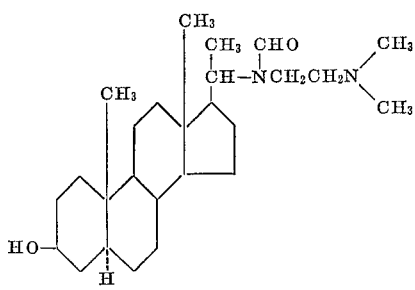

EXAMPLE 2

There is added to 4 parts of 20-(2-piperidinoethyl)amino-5α-pregnan-3β-ol dihydrochloride a premixed and cooled solution containing 40 parts of acetic anhydride and 48.8 parts of formic acid. That reaction mixture is heated on a steam bath for about 3 hours, then is cooled and made alkaline by the addition of aqueous sodium hydroxide. Methanol is added also during that addition in order to maintain solution. The alkaline mixture is then cooled at 0–5° in order to induce crystallization and the resulting granular solid is collected by filtration, then purified by recrystallization from aqueous acetone to afford 20-[N-(2-piperindoethyl)formamido] - 5α - pregnan-3β-ol, melting at about 110–112°. This compound is represented by the following structural formula

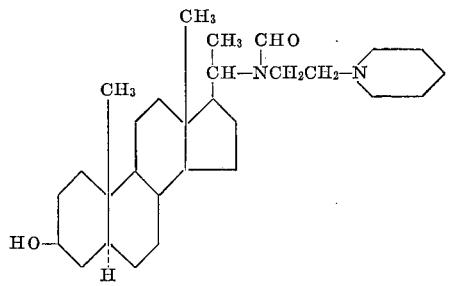

EXAMPLE 3

When an equivalent quantity of 20-(2-pyrrolidinoethyl)amino-5α-pregnan-3β-ol is substituted in the procedure of Example 2, there is produced 20[N-(2-pyrrolidinoethyl)formamido]-5α-pregnan-3β-ol.

EXAMPLE 4

By sustituting an equivalent quantity of 20-(3-diethylaminopropyl)amino-5α-pregnan-3β-ol and otherwise proceeding according to the processes described in Example 2, there is obtained 20-[N-(3-diethylaminopropyl)-formamido]-5α-pregnan-3β-ol.

EXAMPLE 5

A solution containing 10 parts of acetic anhydride and 12.2 parts of formic acid is prepared and cooled, then is added to 0.9 part of 20-(2-dimethylaminoethyl)-aminopregn-5-en-3β-ol, and the resulting reaction mixture is heated on a steam bath for about 3 hours. The mixture is cooled, diluted with ice and methanol, the made alkaline by the addition of aqueous sodium hydroxide. Extraction of that alkaline mixture with ether affords an organic solution, which is washed with water, dried over anhydrous sodium sulfate and stripped of solvent under reduced pressure, thus affording an oily residue. Purification of that oil by recrystallization from acetone-hexane affords 20-[N-(2-dimethylaminoethyl)formamido]pregn - 5-en-3β-ol, melting at about 142–143°. This compound exhibits an optical rotation of —68° and is represented by the following structural formula

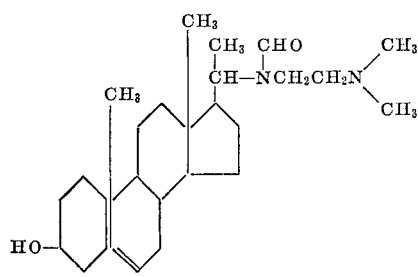

EXAMPLE 6

The substitution of an equivalent quantity of 20-(3-diethylaminopropyl)aminopregn-5-en-3β-ol in the procedure of Example 5 results in 20-[N-(3-diethylaminopropyl) formamido]pregn-5-en-3β-ol.

EXAMPLE 7

By substituting an equivalent quantity of 20-(2-diethylaminoethyl)amino-5α-pregnan-3β-ol and otherwise proceeding according to the processes described in Example 5, there is obtained 20-[N-(2-diethylaminoethyl)formamido]-5α-pregnan-3β-ol.

What is claimed is:

1. A compound of the formula

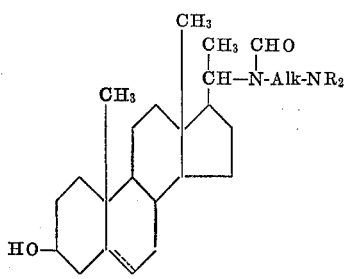

wherein Alk is a lower alkylene radical, NR₂ represents a disubstituted amino radical selected from the group consisting of di-(lower alkyl)amino, pyrrolidino and piperidino and the dotted line denotes an optional 5,6 double bond.

2. As in claim 1, a compound of the formula

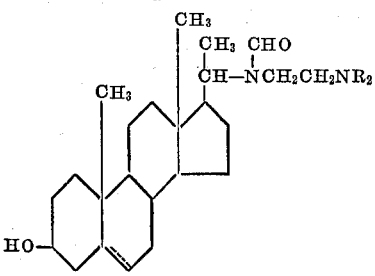

wherein NR₂ represents a disubstituted amino radical selected from the group consisting of di(lower alkyl)amino, pyrrolidino and piperidino and the dotted line denotes an optional 5,6 double bond.

3. A compound of the formula

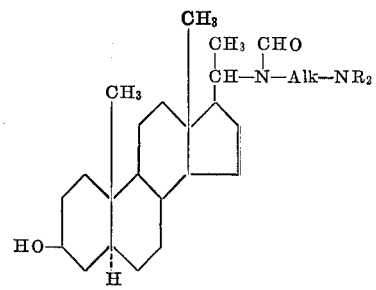

wherein Alk is a lower alkylene radical and NR₂ is a disubstituted amino radical selected from the group consisting of di(lower alkyl)amino, pyrrolidino and piperidino.

4. As in claim 1, the compound which is 20-[N-(2-dimethylaminoethyl)formamido]-5α-pregnan-3β-ol.

5. As in claim 1, the compound which is 20-[N-(2-dimethylaminoethyl)formamido]pregn-5-en-3β-ol.

6. As in claim 1, the compound which is 20-[N-(2-piperidinoethyl)formamido]-5α-pregnan-3β-ol.

No references cited.

HENRY A. FRENCH, Primary Examiner

U.S. Cl. X.R.
260—397.5, 999